United States Patent
Ptacek (10) Patent No.: US 7,152,541 B2
(45) Date of Patent: Dec. 26, 2006

(54) AGRICULTURAL PLANTING MACHINE HAVING INTERCHANGEABLE SEED METERS

(75) Inventor: Timothy J. Ptacek, Salina, KS (US)

(73) Assignee: Great Plains Manufacturing, Incorporated, Salina, KS (US)

(*) Notice: Subject to any disclaimer, the term of this patent is extended or adjusted under 35 U.S.C. 154(b) by 223 days.

(21) Appl. No.: 10/875,729

(22) Filed: Jun. 24, 2004

(65) Prior Publication Data

US 2005/0284350 A1 Dec. 29, 2005

(51) Int. Cl.
*A01C 7/00* (2006.01)
*A01C 9/00* (2006.01)

(52) U.S. Cl. ..................................... 111/185
(58) Field of Classification Search ................ 111/63, 111/177, 183–185, 149–167
See application file for complete search history.

(56) References Cited

U.S. PATENT DOCUMENTS 6,308,645 B1  10/2001  Newkirk et al.
6,604,475 B1  8/2003  Peterson et al.

OTHER PUBLICATIONS

Kinze 2000 Series Planters (Rev. 8-96) (Front cover, Back cover, pp. 4 and 5).

*Primary Examiner*—Christopher J. Novosad
(74) *Attorney, Agent, or Firm*—Hovey Williams LLP

(57) ABSTRACT

Each opener of a seed planting machine may be essentially tool-free equipped with a selected one of two or more types of interchangeable singulating meters. Each type of meter is mounted on its own adapter plate to present a module that has quick-attach mounting projections arranged and configured in an identical manner to all other modules. The projections fit into mating slots on an upright member of the opener, and the upper projection of each pair is in the nature of a downturned hook that facilitates hanging the module on the opener while also retaining it against fore-and-aft displacement. A stabilizing clip at the rear of the module securely receives the lower, rear edge of the adapter plate, and an over-center toggle latch securely retains the plate within the stabilizing clip to complete the solid yet readily removable attachment of the meter to the opener. A chain drive assembly for the meter is permanently installed on the opener so as to not be removed therefrom during interchanging of the meters. A support plate for the drive assembly is normally close to the meter in an operating position but can be swung outwardly to a release position when a latch between the support plate and the metering module is released, thus disengaging the drive assembly from the meter and providing clearance for the metering module to be lifted and removed from the opener.

15 Claims, 8 Drawing Sheets

AGRICULTURAL PLANTING MACHINE HAVING INTERCHANGEABLE SEED METERS

TECHNICAL FIELD

The present invention relates generally to agricultural seed planting machines and, more particularly, to a planting machine having quickly and easily interchangeable seed singulating meters for enabling the operator to equip the machine with the most appropriate meter for the particular type of seeds to be planted.

BACKGROUND AND SUMMARY

Seed meters for singulating seeds from a bulk supply thereof are well known in the art. It is also generally perceived that some machines have meters that are better suited for certain types of seeds than others. For example, while soy bean seeds tend to be fairly uniform in size and shape, corn seeds are not nearly so uniform, introducing variables that make it difficult to utilize the same type of meter for both types of seeds.

In accordance with the present invention, a single seed planting machine may utilize readily interchangeable types of seed meters to permit the machine to be quickly and easily equipped with the best meter for the particular crop to be planted. In a preferred form of the invention, no tools are needed for making the exchange.

In accordance with the present invention, each type of meter is permanently mounted on its own individual adapter that has the precisely the same type and configuration of mounting structure as all the other adapters, regardless of the differences between the meters themselves. The meters and adapters thus form individual metering modules with different metering characteristics and configurations but identical mounting structures. A quick release coupling arrangement is provided between a permanently installed drive assembly on each opener and the meter to facilitate installation and removal of modules from the opener, while quick release latches securely retain the selected module in its operating position on the opener.

In a preferred form of the invention, the adapter of each module is in the nature of an upright plate having a forward extremity provided with an upper mounting hook and lower locating tab that fit into corresponding receiving slots on a permanent upright member of the opener so that the module effectively hangs from the upright mounting member. An upwardly opening stabilizing clip adjacent the rear of the module receives the lower rear edge of the adapter plate to prevent side-to-side movement of the installed module, and an over-center toggle latch at the rear of the adapter plate maintains the plate securely seated within the stabilizing clip. The drive assembly of the opener is mounted on a permanently mounted upright support plate that may be pivoted a short distance outwardly away from the module to withdraw the drive assembly from driving relationship with the meter of the opener, permitting the metering module to be lifted off the opener. A quick-release latch between the support plate and the adapter plate of the module keeps the drive assembly in proper position for driving the meter.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
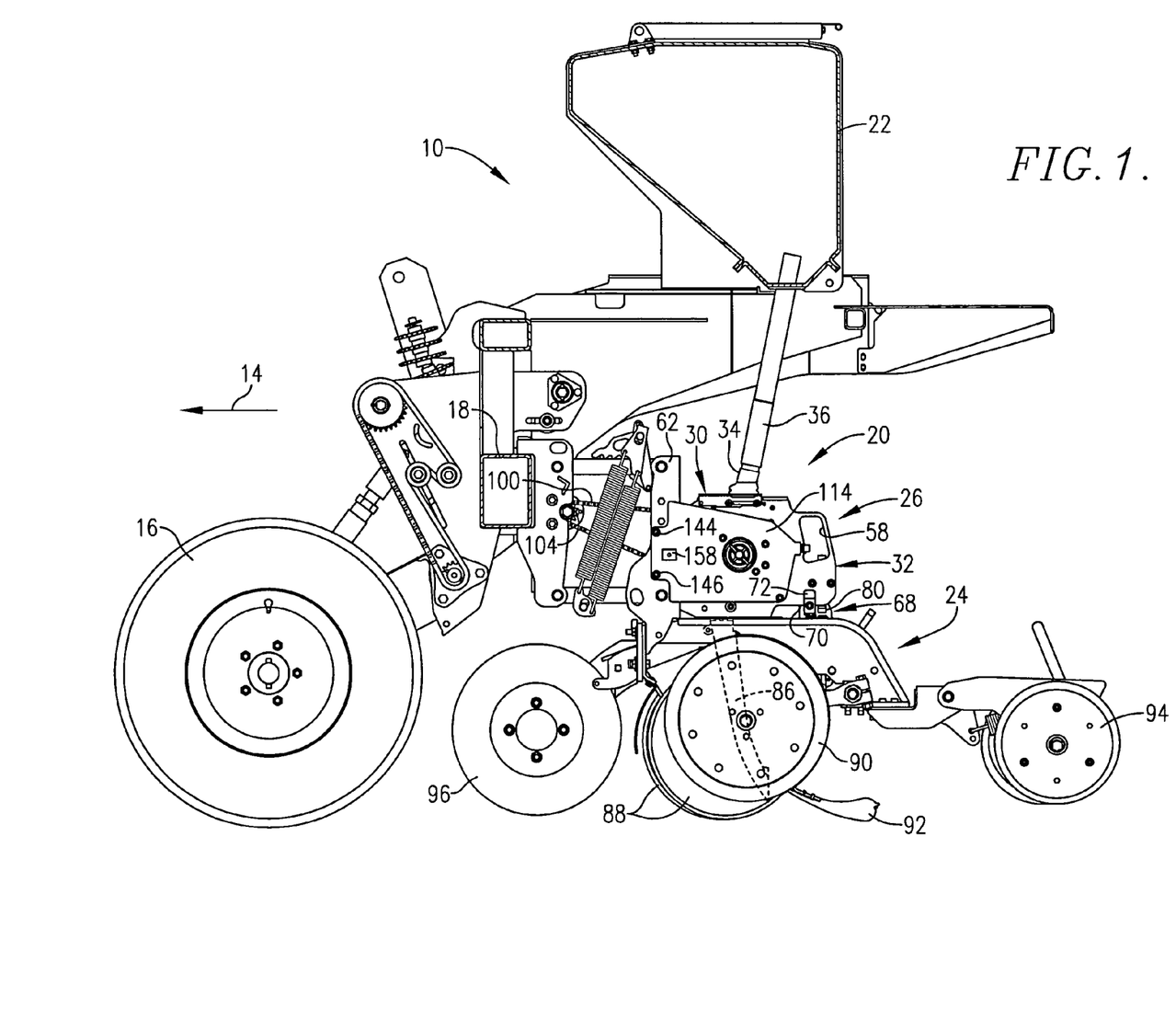
FIG. 1 is a fragmentary side elevational view of one preferred embodiment of a seed planting machine incorporating the principles of the present invention.
Figure 2:
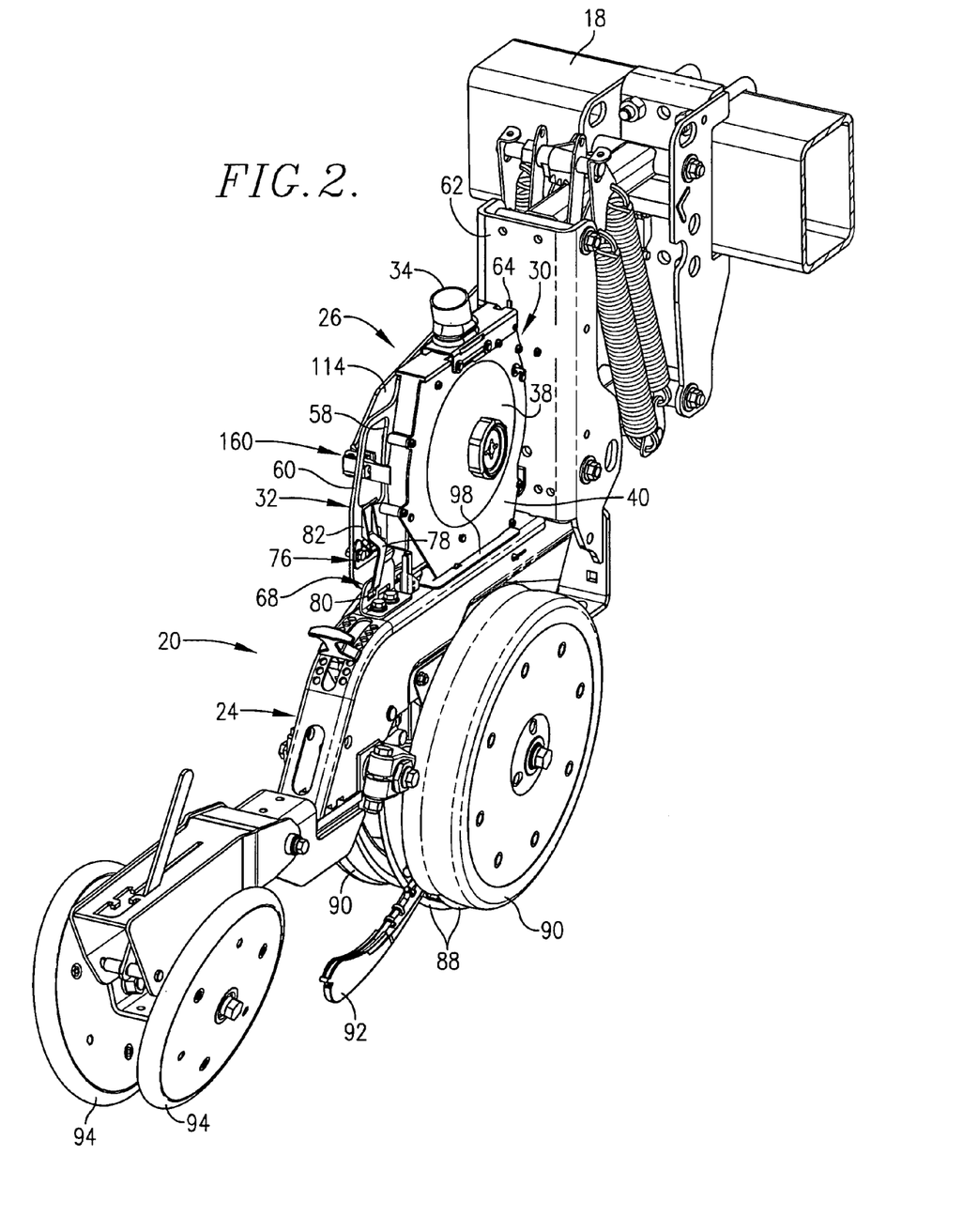
FIG. 2 is a fragmentary rear isometric view of one of the row units of the machine showing the opener thereof fitted with one of two or more interchangeable metering modules for the opener.

FIG. 1 shows a seed planting machine 10 comprising one embodiment of the present invention. Machine 10 is similar in many respects to the seed planting machine disclosed in U.S. Pat. No. 6,308,645 owned by the assignee of the present invention. Therefore, the '645 patent is incorporated by reference herein as a disclosure of certain constructional features not otherwise specifically depicted or described in this specification. Further, it will be noted that while the machine illustrated in FIG. 1 may be characterized as a box drill or a box planter wherein seeds are delivered to the row units by gravity from an overhead bulk seed container or box, the principles of the present invention may also be applied with great utility to an air planter machine wherein seeds are delivered to the row units by air from a central source of supply such as a tank mounted on the frame of the machine or on a separate, wheeled cart.

In the particular illustrated embodiment, machine 10 includes a frame 12 that is adapted to be connected to the three-point hitch of a tractor (not shown) for movement along a path of travel in the direction of arrow 14. It will be appreciated that frame 12 could also be provided with a hitch tongue (not shown) to embody the invention in a pull-type machine trailed behind a towing tractor. Gauge wheels 16 at the front of frame 12 keep the machine at a selected height and provide driving power for various driven components of the machine as wheels 16 engage and are rotated by the ground during forward travel of the machine.

Frame 12 includes a transverse tool bar 18 to which a number of row units 20 are mounted across the width of the machine. One or more bulk seed containers or boxes 22 are supported on frame 12 above the row units 20 for supplying seeds thereto. Each row unit 20 includes an opener broadly denoted by the numeral 24 and swingably mounted on tool bar 18 for up and down movement relative to seed box 22, as well as a seed metering module that may take any one of several different forms. In the illustrated embodiments, two of such forms are disclosed, namely the module 26 of FIGS. 1, 2, 5 and 8 for example, and the module 28 of FIGS. 3, 6 and 14, for example. In other words, the machine 10 may be set up so that all of its row units 20 are provided with either the metering module 26 or the metering module 28 depending upon personal preference and considering the nature and characteristics of the particular seeds to be planted. While each opener 24 remains essentially permanently mounted on the tool bar 18 and appears as shown in FIG. 4, the modules 26 and 28 are interchangeably mountable upon opener 24.

Dealing first with module 26, such module includes a meter 30 and an adapter in the form of an adapter plate 32 that renders meter 30 quickly and easily mountable on opener 24. In one preferred form of the invention, meter 30 may be similar in principles of operation and many constructional features to the meters disclosed in the incorporated '645 patent although, of course, such meter may also take a variety of different forms without departing from the principles of the present invention. Meter 30 has an inlet 34 at its top end that communicates with a telescoping supply tube 36 (FIG. 1) leading upwardly into seed container 22 to supply meter 30 with seeds. A rotatable metering wheel 38 (FIG. 2) retained within a housing 40 of meter 30 provides the singulating action for the mass of seeds supplied to meter 30 from container 22.

Figures 8, 9, 10:
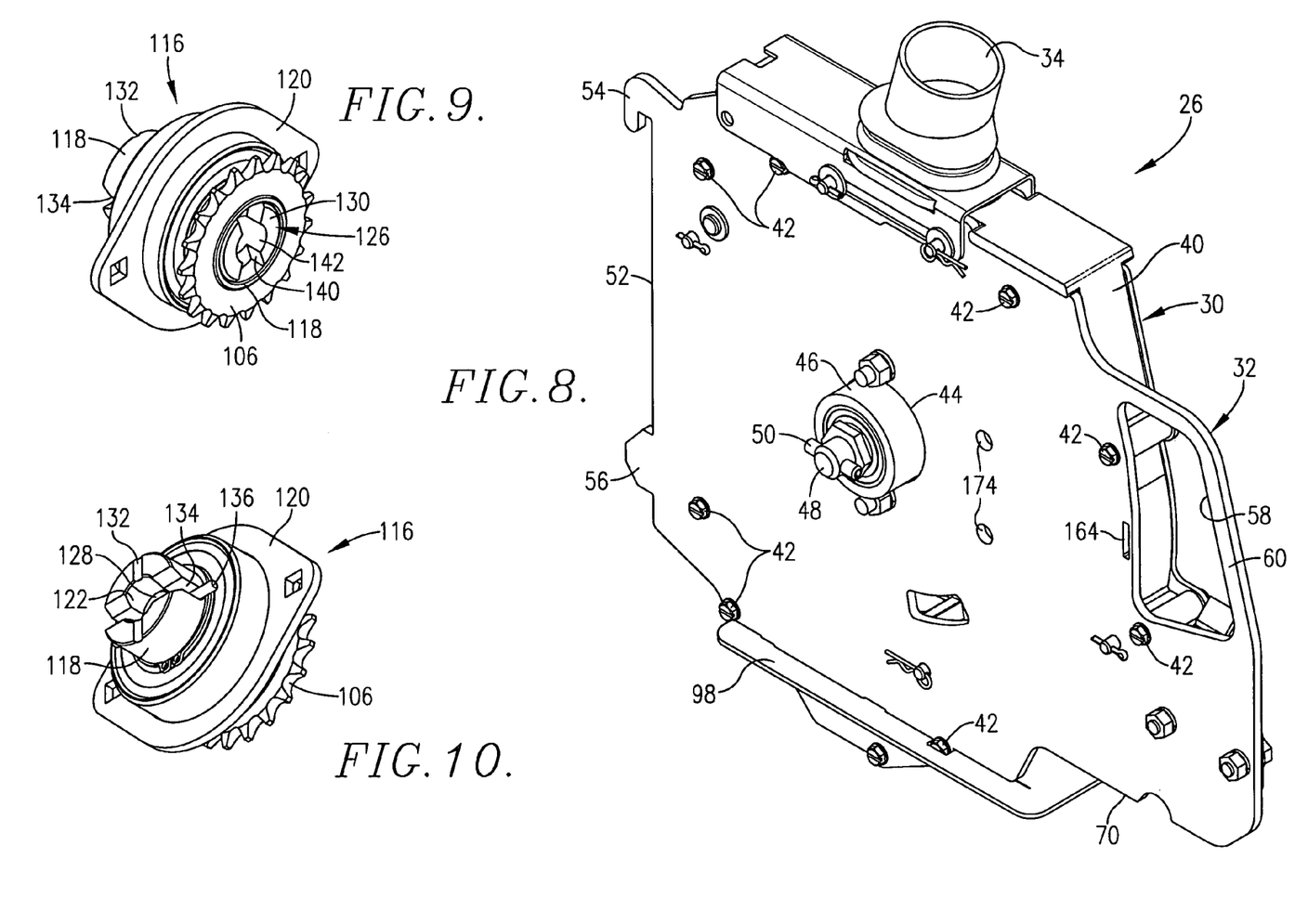
FIG. 8 is a top, left, rear isometric view of the module of FIGS. 2 and 5.
FIG. 9 is a top, right, rear isometric view of the releasable meter-engaging clutch of the drive assembly on each opener.
FIG. 10 is a bottom, left, rear isometric view of the clutch assembly.

Meter 30 is fastened securely to adapter plate 32 using a plurality of machine screws 42 as shown, for example, in FIG. 8. A hole 44 in the central portion of adapter plate 32 provides clearance for a hub 46 of meter 30 that projects through and beyond plate 32. Hub 46 is stationary and rotatably journals a metering component of meter 30 in the nature of an input stub shaft 48 that is fixed to metering wheel 38 for rotating the same when driving power is supplied to stub shaft 48. A transverse projection in the nature of a drive pin 50 projects radially from stub shaft 48 in opposite directions.

Adapter plate 32 has a front edge 52 provided with quick-release mounting structure in the form of a pair of fore-and-aft extending, vertically spaced mounting projections 54 and 56. The upper projection 54 is in the nature of a downturned hook or hanger, while lower projection 56 is in the nature of a straight tab having a tapered forwardmost free end. At its rear extremity, adapter plate 32 is provided with a cut-out 58 that forms a gripping handle 60 to facilitate mounting and dismounting of module 26 from opener 24.

Figure 4:
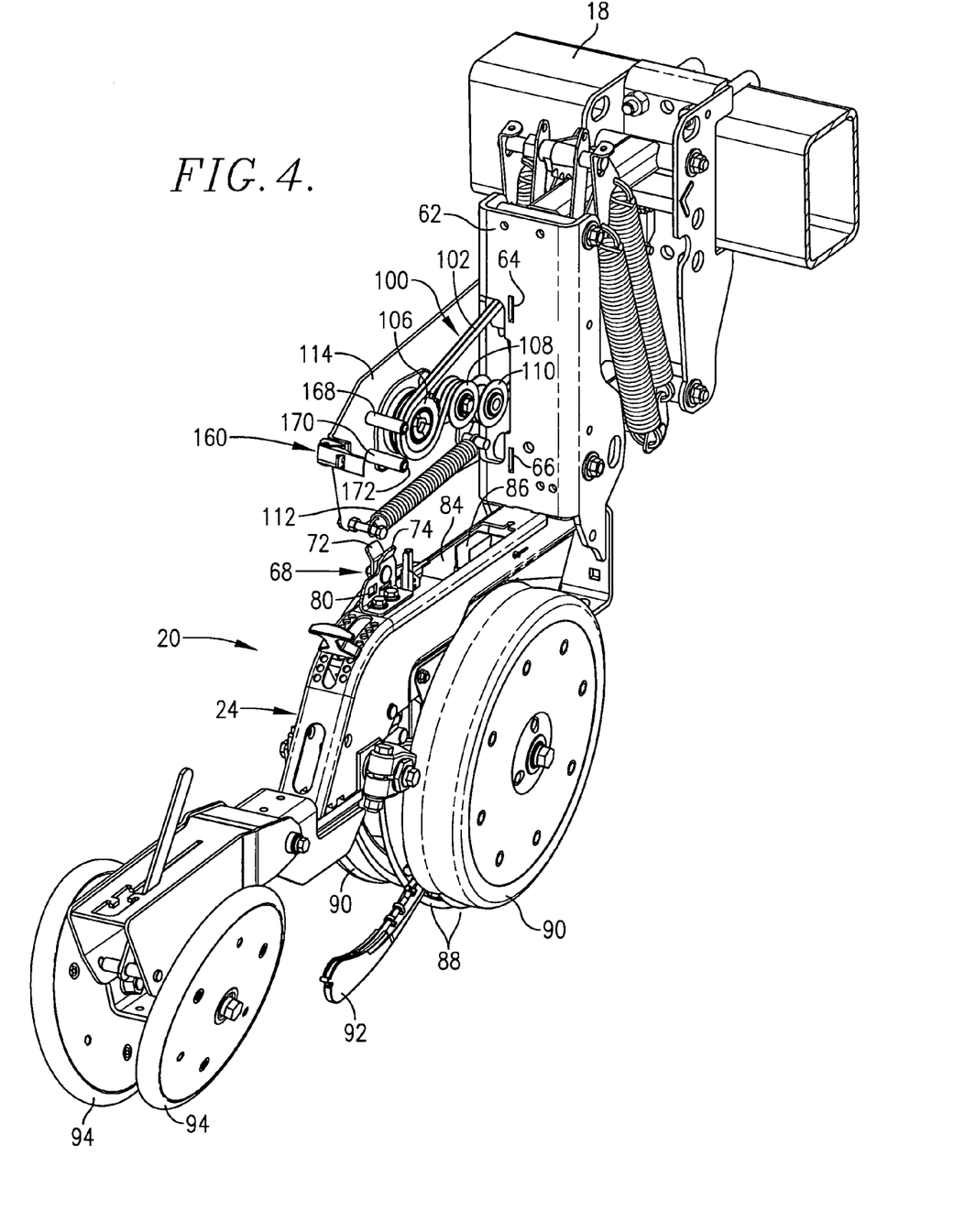
FIG. 4 is another rear isometric view of the row unit of FIGS. 2 and 3 but without any metering module installed on the opener thereof so as to reveal details of the permanently mounted drive assembly and other structure.
Figures 5, 6, 7:
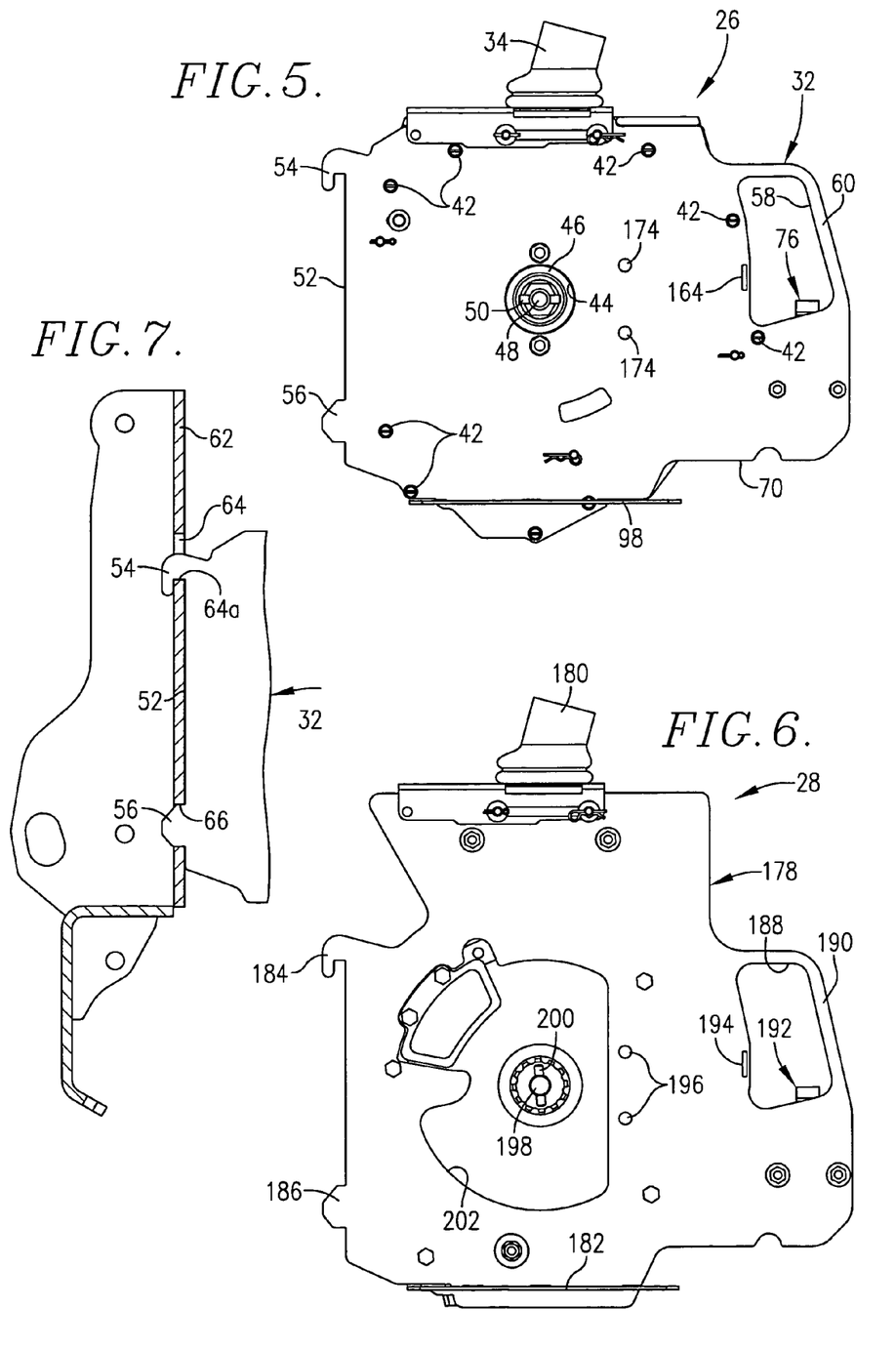
FIG. 5 is an elevational view of the drive input side of the metering module of FIG. 2.
FIG. 6 is an elevational view of the drive input side of the metering module of FIG. 3.
FIG. 7 is an enlarged, fragmentary, vertical cross-sectional view illustrating the manner in which the modules are carried on the opener by quick-release mounting structure at the front end of the modules.

As illustrated best in FIGS. 4 and 7, opener 24 includes a rigid upright member 62 adjacent its front end that is provided with a pair of vertically spaced, upright mounting slots 64 and 66 adapted to receive hook 54 and tab 56 of adapter plate 32 respectively. Upper slot 64 presents a lower edge 64a over which hook 54 is placed whereby to hang module 26 from member 62. Tab 56 within slot 66 provides additional vertical support and also stabilizes module 26 in a lateral sense.

Spaced rearwardly from member 62 along an upper, horizontal surface of opener 24 is an upstanding receiving clip 68 disposed in fore-and-aft alignment slots 64, 66 for securely receiving a rear, lower edge 70 of adapter plate 32 when mounting projections 54 and 56 are received within slots 64 and 66. Preferably, receiving clip 68 has a pair of somewhat resilient, upwardly projecting and laterally diverging wings 72 and 74 that become disposed on opposite sides of adapter plate 32 when the later is received within clip 68, the diverging nature of such wings facilitating insertion and removal of plate 32 from clip 68. As illustrated best in FIG. 2, an over-center toggle latch 76 is mounted on the outer rear face of adapter plate 32 for the purpose of releasably holding plate 32 within receiving clip 68. A strap 78 of latch 76 may be hooked at its lower end into a hole 80 on clip 68. Strap 78 is operated by an over-center lever 82 of latch 76.

When module 26 is mounted on opener 24, a lower portion of meter 30 and adapter plate 32 project downwardly into a generally rectangular opening 84 in the top surface of opener 24 as illustrated best in FIG. 4. The outlet (not shown) of meter 30 is thus operatively communicated with the upper end of a seed tube 86 extending downwardly between the rear portions of a pair of downwardly and forwardly converging double discs 88 that produce a furrow in the ground for seeds from tube 86. In the illustrated embodiment, a pair of depth-gaging wheels 90 are provided on opposite sides of discs 88, and a seed firming device 92 projects rearwardly from between discs 88 for gently pressing seeds down into the bottom of the furrow. A pair of closing wheels 94 or the like may be provided at the rear of opener 24 for closing soil over the deposited seeds. A trash cutting coulter 96 may be provided in leading relationship to discs 88 to facilitate formation of a properly configured furrow, and a thin, flat rubberized gasket or cover 98 (FIGS. 2, 5 and 8) may be provided over the opening 84 in opener 24 in surrounding relationship to the lower portions of adapter plate 32 and meter 30.

Figures 14, 15, 16, 17:
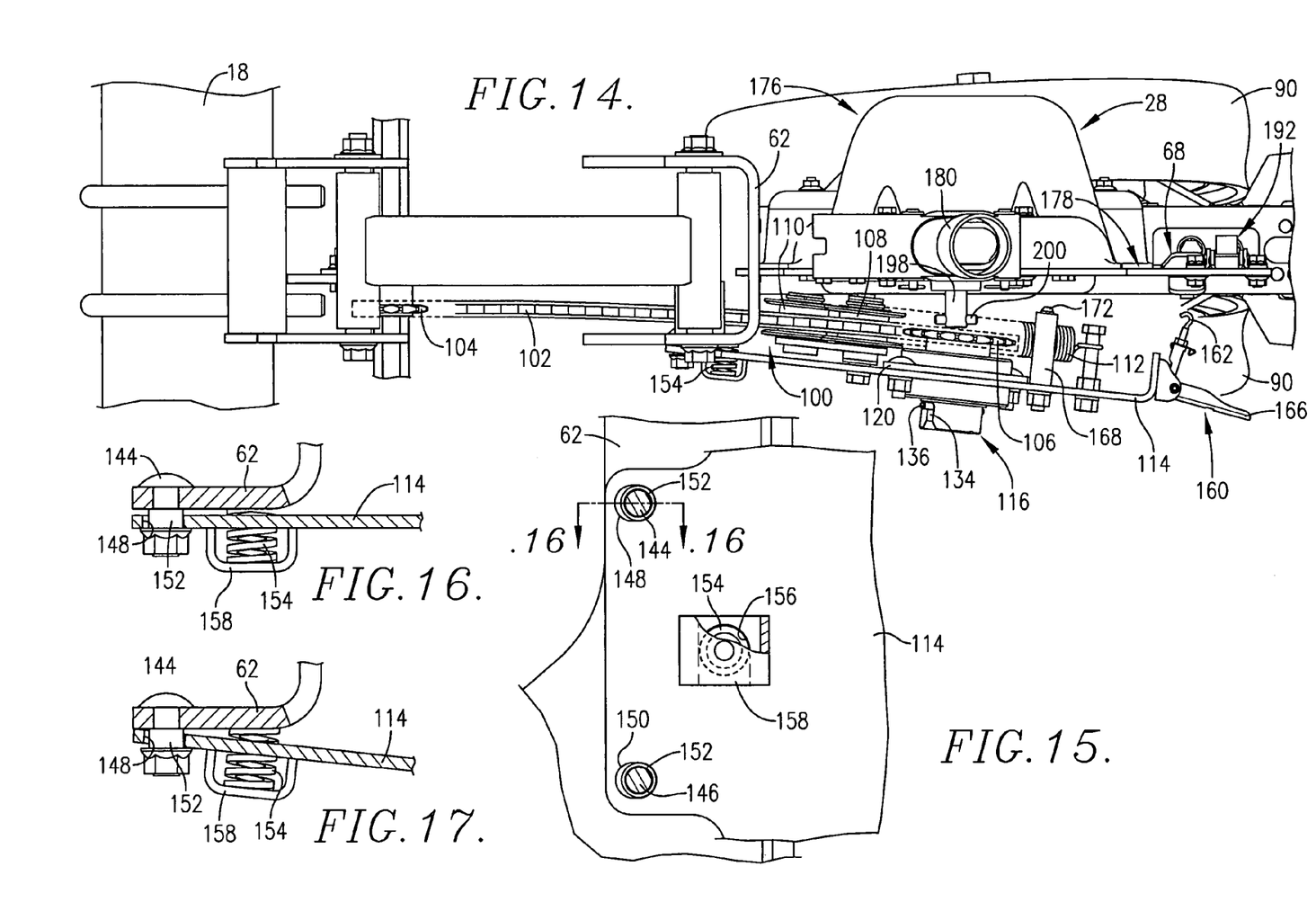
FIG. 14 is a fragmentary top plan view of the opener provided with the metering module of FIG. 3 and with the drive assembly support plate swung out to a released position to withdraw the drive assembly from the metering module.
FIG. 15 is an enlarged, fragmentary side elevational view of the front end of the opener illustrating the manner in which the drive assembly support plate is pivotally mounted.
FIG. 16 is an enlarged, fragmentary cross-sectional view of the opener taken substantially along line 16—16 of FIG. 15 with the drive assembly support plate in its operating position.
FIG. 17 is an enlarged, fragmentary cross-sectional view of the opener similar to FIG. 16 but showing the drive assembly support plate pivoted out to its released position.

Each row unit 20 further includes a drive assembly 100 for driving meter 30. Referring initially to FIGS. 4 and 14, it may be seen that drive assembly 100 includes an endless chain 102 looped around a front drive sprocket 104 at the front end of opener 24 (see also FIG. 1). Drive sprocket 104 is driven by the ground wheels 16 at the front of the machine. At its rear end, chain 102 is entrained around a driven sprocket 106, while the slack side of chain 102 is tensioned by a pair of tension idlers 108 and 110 operating in conjunction with a tension spring 112. Sprockets 106, 108 and 110 are rotatably supported by an upright support plate 114 that also provides support for one end of tension spring 112.

Figure 11:
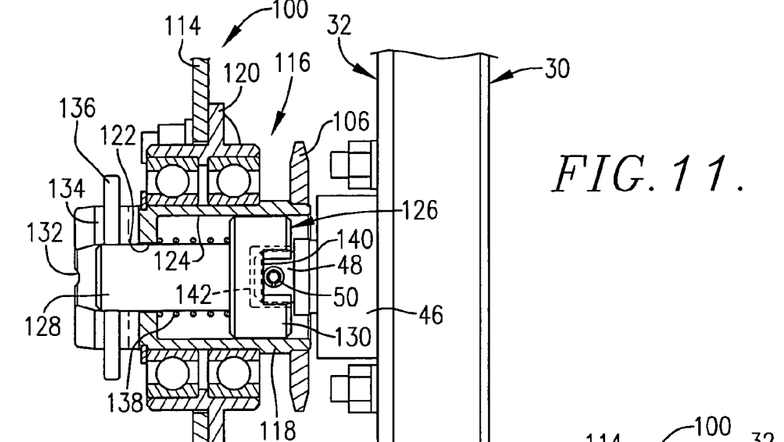
FIG. 11 is an enlarged, fragmentary vertical cross-sectional view through portions of the clutch assembly and adjacent metering module illustrating the clutch in an engaged condition.
Figure 12:
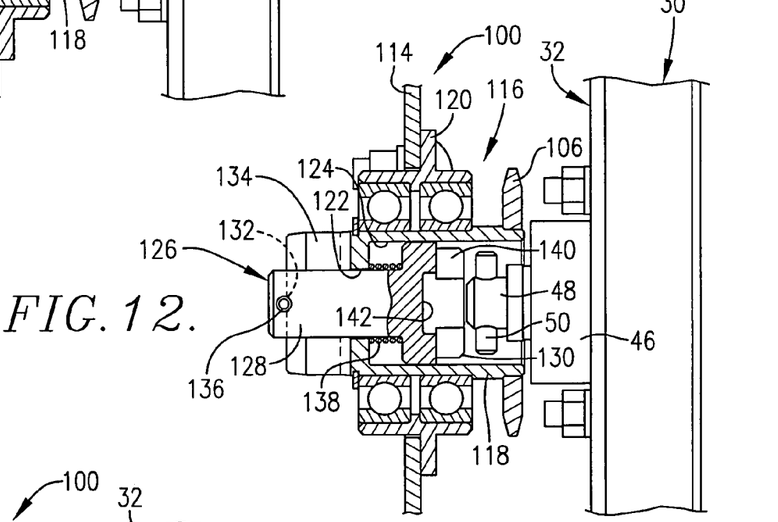
FIG. 12 is a fragmentary cross-sectional view similar to FIG. 11 but showing the clutch in a disengaged condition.
Figure 13:
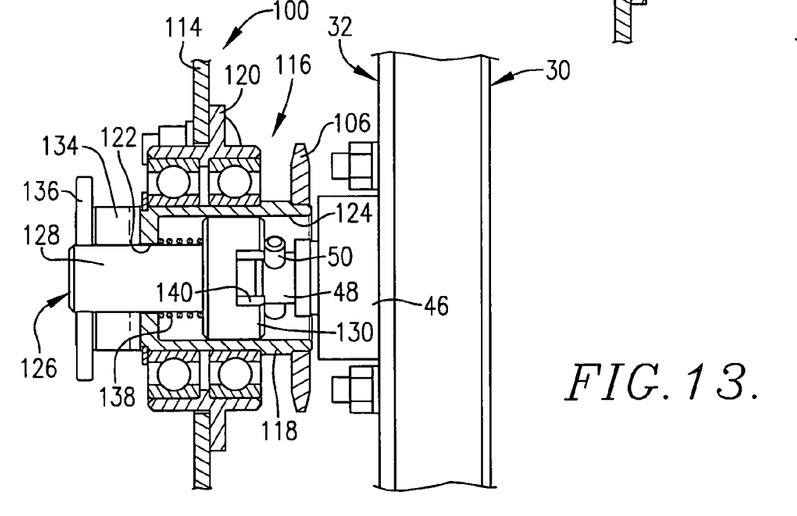
FIG. 13 is a fragmentary cross-sectional view similar to FIGS. 11 and 12 but illustrating the manner in which the clutch component of the drive assembly is in spring-biased readiness for snapping into driving engagement with the drive shaft of the metering module even when transverse drive slot of the drive assembly and the transverse drive pin of the metering module are initially not aligned for interengagement.

FIGS. 11–13 illustrate in more detail the relationship between drive assembly 100 and stub shaft 48 of meter 30. FIGS. 9 and 10 are also helpful in this respect. Although not a requirement insofar as the principles of the present invention are concerned, in one preferred embodiment of the invention driving power from sprocket 106 of drive assembly 100 is supplied to stub shaft 48 of meter 30 via a clutch assembly 116 that forms a part of drive assembly 100 such that meter 30 may be selectively enabled for or disabled from seed metering. This can be especially beneficial in those situations in which the seed is to be dispensed only from certain of the row units and not others. For example, while the row units may be fairly closely spaced apart along tool bar 18, it may be desired to increase the row spacing, in which case alternate row units could be disconnected from driving power by disengaging their respective clutches 116.

Clutch assembly 116 includes a generally cylindrical hub 118 that is rotatably supported by a bearing assembly 120 secured to support plate 114. Sprocket 106 is fixedly secured to the end of hub 118 closest to meter 30, while the opposite end of hub 118 projects outwardly beyond the outside of support plate 114 and bearing assembly 120. A first, small bore 122 leads inwardly from the outboard end of hub 118, while a second, larger bore 124 extends from the inboard termination of small bore 122 to the inboard end of hub 118. A clutch member 126 has a smaller diameter shank 128 thereof received within small bore 122 for axial displacement therein, as well as an enlarged head 130 received within larger bore 124 and reciprocable axially thereof. The outboard end of hub 118 is provided with a pair of cross slots 132 and 134 disposed at right angles to one another. Cross slot 132 is fairly shallow, while cross slot 134 is relatively deep. A cross pin 136 in the outboard end of clutch member 126 is adapted to be alternatively received within the shallow cross slot 132 or the deep cross slot 134. When cross pin 136 is disposed within shallow cross slot 132, clutch assembly 116 is in its disengagement condition (FIG. 12), while when cross pin 136 is within the deeper cross slot 134, clutch assembly 116 is in its engagement condition as illustrated in FIG. 11.

A manually compressible coil spring 138 is contained within large bore 124 in surrounding relationship to stem 128 and between the underside of head 130 and the outboard end of large bore 124. Spring 138 thus yieldably biases clutch member 126 inwardly toward the inboard end of hub 118, thus yieldably biasing clutch assembly 116 toward its engagement condition. At its inboard end, head 130 of clutch member 126 is provided with a transverse groove 140 and with an axially extending socket 142. Socket 142 receives the outboard end of stub shaft 48 and groove 140 receives the transverse drive pin 50 of stub shaft 48 when clutch assembly 116 is in its engagement position as in FIG. 11. On the other hand, when clutch member 126 is disposed with cross pin 136 in cross slot 132 as shown in FIG. 12, head 130 of clutch member 136 is retracted sufficiently far from stub shaft 48 to disengage groove 140 from drive pin 150.

FIG. 13 illustrates that drive pin 50 may bear against the inboard end of head 130 when clutch assembly 116 is ready to be re-engaged but drive pin 50 is not aligned with groove 140. Although clutch assembly 116 is not engaged in the condition of FIG. 13, as soon as sprocket 106 is rotated a short distance by chain 102, groove 140 of clutch member 126 comes into rotational alignment with drive pin 150, and spring 138 snaps groove 140 onto drive pin 50.

Drive assembly support plate 114 is permanently mounted on upright member 62 and remains on opener 24 when module 26 is removed. To facilitate such removal, and to provide a quick release of the driving relationship between drive assembly 100 and module 26, support plate 114 can be selectively swung a short distance outwardly away from an operating position of FIGS. 1, 4, 15 and 16, for example, to a release position of FIGS. 14 and 17. When plate 114 is in its release position, the hub 118 of clutch assembly 116 is withdrawn from around stub shaft 48 of meter 30 as shown in FIG. 14, thereby not only disconnecting the operable coupling between drive sprocket 106 and stub shaft 48, but also providing clearance for module 26 to be lifted upwardly off of opener 24.

To provide such swing out movement, support plate 114 is secured to upright member 62 using a pair of vertically spaced bolts 144 and 146 that pass through corresponding slots 148 and 150 in plate 114 that are slightly elongated in a fore-and-aft direction. Cylindrical spacer collars 152 surround the shank of each bolt 144, 146 and are trapped between the nut of bolts 144, 146 and sidewall of member 62 to prevent support plate 114 from being so tightly clamped up against member 62 that plate 114 cannot be swung outwardly. A compression spring 154 passes through a hole 156 (FIG. 15) in plate 114 and is trapped between member 62 and a generally U-shaped bracket 158 on plate 114 to yieldably bias plate 114 toward the release position of FIGS. 14 and 17. An over-center toggle latch 160 on the rear end of plate 114 has a hook 162 (FIG. 15) that may be engaged with a slot 164 (FIG. 8) in adapter plate 32 to releasably retain plate 114 in the operating position. A lever 166 of latch 160 is used to engage and release latch 160. A pair of vertically spaced, horizontally extending stand-offs 168 and 170 (FIGS. 4 and 14) on the inboard face of support plate 114 engage adapter plate 32 when support plate 114 is in its operating position to prevent plate 114 from coming too close to adapter plate 32. Gently rounded tips 172 on stand-offs 168, 170 fit into corresponding locating holes 174 in adapter plate 32 to properly locate support plate 114 in the operating position and to help guide and maintain sprocket 106 and stub shaft 48 into their proper operating relationship with one another when support plate 114 is returned to the operating position from the release position.

Figure 3:
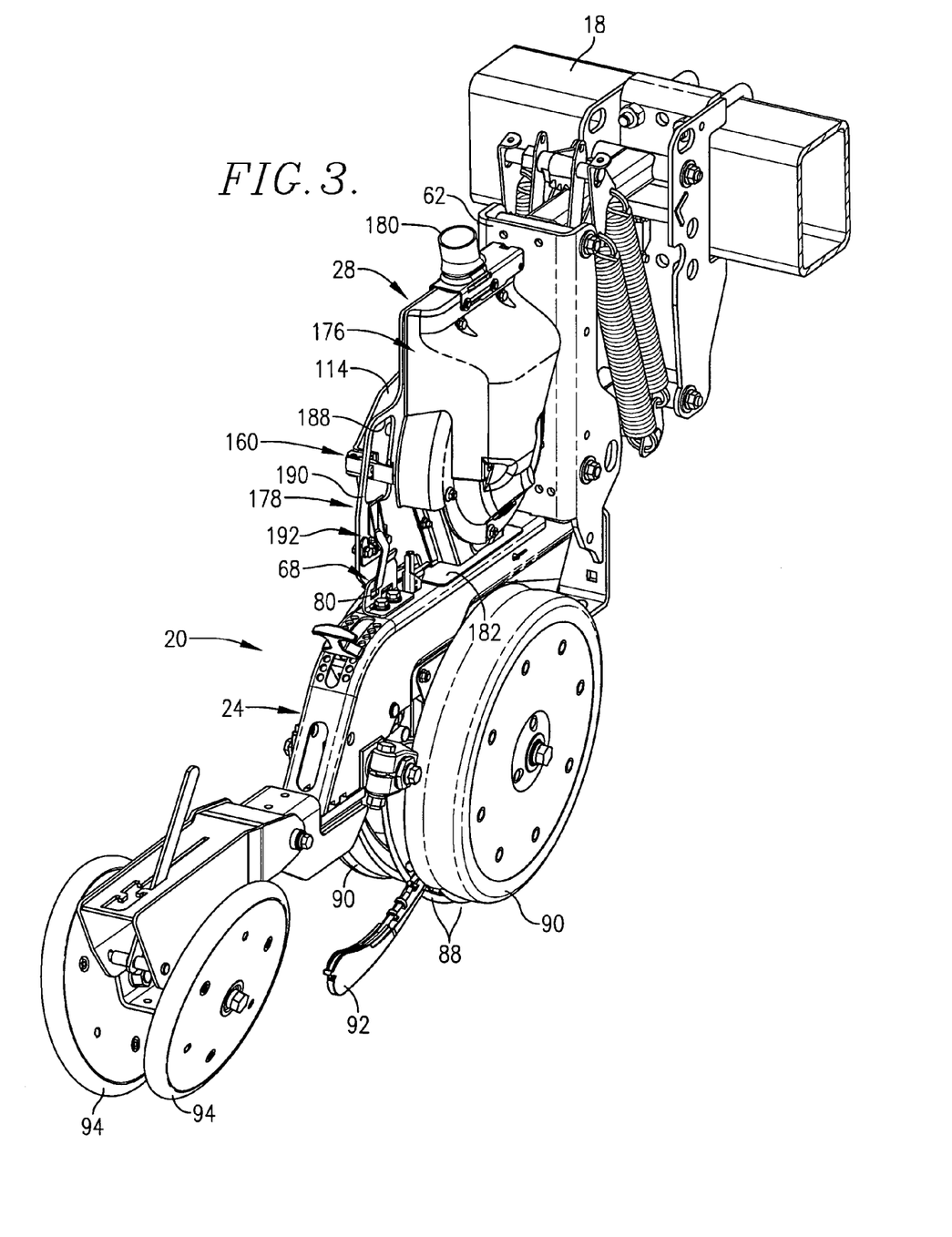
FIG. 3 is a similar rear isometric view of the same row unit as FIG. 2 but with the opener thereof fitted with a second interchangeable metering module.

The alternate metering module 28 shown in FIGS. 3, 6 and 14 has a singulating meter 176 secured to an adapter plate 178 that has many features in common to adapter plate 32 of module 26, although adapter plate 178 is configured differently to adapt to the different configuration of meter 176. In one preferred form of the invention, meter 176 may comprise a finger pick-up type meter available from Precision Planting Company of Tremont, Ill., although a wide variety of other brands of meters may also be employed. This meter is disclosed in U.S. Pat. No. 6,269,758, which is incorporated herein by reference.

Meter 176 has an inlet 180 that communicates with the source of supply of seeds when module 28 is installed on opener 20, and a lower discharge end that communicates with seed tube 86 via opening 84 in opener 24 when module 28 is installed. As with module 26, a flat rubberized gasket 182 covers and seals opening 84 in opener 24 when module 28 is installed.

Although adapter plate 178 is configured somewhat differently than adapter plate 32, in several respects it is essentially the same. For example, projections 184 and 186 at the front of adapter plate 178 are configured and spaced identically to projections 54 and 56 of adapter plate 32 so as to be accepted by slots 64 and 66 in member 62 in the same manner as illustrated in FIG. 7. Similarly, a cut-out 188 near the rear edge of adapter plate 178 defines a handle 190 that is virtually the same if not identical to the handle 60 of adapter plate 32. A toggle latch 192 on the meter side of adapter plate 178 is identical to toggle latch 76 of module 26, and a slot 194 forwardly adjacent cut-out 188 receives the hook 162 of latch 160 on support plate 114 in the same manner as slot 164 of adapter plate 32. A pair of holes 196 in adapter plate 178 are positioned and configured identically to the holes 174 of adapter plate 32 for the purpose of receiving the tips of standoffs 168, 170 of support plate 114 when module 28 is installed on opener 24.

The meter 176 has an input stub shaft 198 corresponding to the stub shaft 48 of meter 30. Stub shaft 198 is provided with a transversely extending drive pin 200 corresponding to drive pin 50 of meter 30, and stub shaft 198 projects through a large opening 202 in adapter plate 178 corresponding to opening 44 in adapter plate 32. Stub shaft 198 and drive pin 200 are adapted to be received in driving relationship with sprocket 106 of drive assembly 116 in the same manner as stub shaft 48 and drive pin 50 of module 26.

In use, the openers 24 of the machine are initially provided with either the meters 30 or 176 as maybe necessary or desirable. Assuming the machine is initially equipped with meter 30, it will be seen from the foregoing description that each adapter plate 32, and thus also its corresponding meter 30, hangs from the upright member 62 using the projections 54, 56 on adapter plate 32 and the corresponding slots 64, 66 in member 62. The bottom region of meter 30 projects downwardly into the opening 84 in the top horizontal portion of opener 24, and the rear portion of plate 32 is snugly received within stabilizing clip 68. The toggle latch 76 holds plate 32 securely within clip 68 such that the entire module 26 is solidly mounted on opener 24. Support plate 114 is securely retained in its operating position by virtue of latch 160 so that drive assembly 100 is in position for operable engagement with the input stub shaft 48 of meter 30. Depending upon whether clutch assembly 116 is in the engaged position of FIG. 11 or the disengaged position of FIG. 12, drive assembly 100 will supply driving power to metering wheel 38 of meter 30 when chain 102 of drive assembly 100 is driven during forward travel of the machine.

To exchange meters, latch 160 is released, which allows support plate 114 and drive assembly 100 to swing outwardly to the release position of FIG. 14, aided in this respect by the compression spring 154. With support plate 114 in its release position, stub shaft 48 of meter 30 is disposed outside of sprocket 106 (as illustrated in FIG. 14 with respect to module 28 and meter 176). Therefore, upon releasing latch 76 and disconnecting supply tube 36 from inlet 34, module 26 may be lifted upwardly and rearwardly, disengaging projections 54, 56 from slots 64, 66 in member 62. Support plate 114 and drive assembly 100, of course, stay behind as illustrated in FIG. 4.

Module 28 may then be installed on the opener by simply hooking the projections 184 and 186 of adapter plate 178 into the vacated slots 64 and 66 on member 62. In the process, the lower portion of meter 176 is inserted into opening 84 of opener 24 and the lower rear edge of adapter plate 178 is inserted down into stabilizing clip 68. Latch 192 is engaged to complete the securence of module 28 to opener 24, while supply tube 36 is coupled with inlet 180 to establish a supply path from overhead container 22. By then swinging support plate 114 inwardly from its release position of FIG. 14 to its operating position, input stub shaft 198 of meter 176 becomes received within hub 118 of drive assembly 116, and latch 160 can be engaged to retain support plate 114 in its operating position. If drive pin 200 of stub shaft 198 is aligned with groove 140 in drive head 130 and clutch assembly 116 is in its engaged condition, cross pin 50 will be received within groove 140 to establish an operable driving relationship between drive assembly 100 and meter 176. In the event that drive pin 200 is not perfectly aligned with groove 140 at this initial time, which is quite likely the case, drive pin 200 will simply bear against the face of head 130 and slightly depress clutch member 126 to the extent allowed by spring 138 as illustrated in FIG. 13 with respect to meter 30. Once sprocket 106 begins to rotate through the input power of chain 102, groove 140 will come into alignment with drive pin 200, causing head 130 to snap into driving engagement with drive pin 200 and stub shaft 198.

It should thus be apparent that interchanging meters 30 and 176 can be accomplished quickly and easily. Yet, there is no sacrifice in structural stability of the meters when installed on their openers, or compromise in operating performance. Obviously, more than two types of meters may be interchanged, and the concepts of the present invention may be applied with equal utility to both purely mechanical meters and air delivery meters.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In an agricultural seed planting machine, the improvement comprising:
    a mobile frame;
    at least one ground-engaging opener mounted on the frame;
    a support mounted on the opener;
    a drive assembly mounted on said support; and
    at least a pair of seed meters interchangeably attachable to said opener and releasably engageable with said drive assembly when attached to the opener,
    each of said meters being provided with attaching structure for releasably securing the selected meter to the opener,
    said support being separate from said meters and being operable to maintain the drive assembly supported on the opener when the meters are detached and removed from the opener.

2. In an agricultural seed planting machine as claimed in claim 1,
    said support being releasably securable to the meter on the opener.

3. In an agricultural seed planting machine as claimed in claim 1,
    each meter being secured to an upright adapter plate,
    said attaching structure being located on the adapter plate.

4. In an agricultural seed planting machine as claimed in claim 3,
    said opener including an upright member having a generally horizontally extending support edge,
    said attaching structure comprising a hook on the adapter plate adapted to be removably engaged over said edge.

5. In an agricultural seed planting machine as claimed in claim 4,
    said support edge comprising part of a slot in the upright member,
    said hook being received within said slot.

6. In an agricultural seed planting machine as claimed in claim 5,
 said upright member further including a second slot below the first-mentioned slot,
 said attaching structure further comprising a tab on the adapter plate adapted to be removably received within said second slot.

7. In an agricultural seed planting machine as claimed in claim 1,
 further comprising a bulk seed container carried on said frame,
 the selected meter being disposed in operable communication with the container for receiving seeds therefrom when the meter is attached to the opener,
 said opener and meter being shiftable upwardly and downwardly relative to said container.

8. In an agricultural seed planting machine as claimed in claim 1,
 each of said meters having a driven shaft,
 said shaft having a transverse projection and said drive assembly including a drive member having a groove for drivingly receiving said projection,
 said drive member being selectively axially shiftable away from said shaft for disengaging the groove from the projection.

9. In an agricultural seed planting machine, the improvement comprising:
 a mobile frame;
 at least one ground-engaging opener mounted on the frame;
 a drive assembly on said opener; and
 at least a pair of seed meters interchangeably attachable to said opener and releasably engageable with said drive assembly, each of said meters being provided with attaching structure for releasably securing the same to the opener,
 said opener including an upright member having a pair of vertically spaced slots,
 said structure including a pair of vertically spaced projections at a front end thereof receivable within said slots for supporting the meter on said upright member.

10. In an agricultural seed planting machine as claimed in claim 9,
 the upper projection of said pair of projections comprising a hook operable to engage a lower edge of the upper slot of said pair of slots for hanging the meter from the upright member.

11. In an agricultural seed planting machine as claimed in claim 10,
 said opener being provided with an upwardly facing receiver for receiving a portion of the meter adjacent a rear end thereof to retain the meter against lateral movement.

12. In an agricultural seed planting machine as claimed in claim 11,
 further comprising a latch for releasably securing the meter to the receiver.

13. In an agricultural seed planting machine, the improvement comprising:
 a mobile frame;
 at least one ground-engaging opener mounted on the frame;
 a drive assembly on said opener;
 at least a pair of seed meters interchangeably attachable to said opener and releasably engageable with said drive assembly,
 each of said meters being provided with attaching structure for releasably securing the same to the opener; and
 a support on the opener for the drive assembly,
 said support being releasably securable to the meter on the opener,
 said support being mounted on the opener in such a manner that the support may be shifted away from the meter when the support is released from the meter to facilitate detachment of the meter from the opener.

14. In an agricultural seed planting machine as claimed in claim 13,
 said support being provided with a spring yieldably biasing the support away from the meter.

15. In an agricultural seed planting machine as claimed in claim 14,
 said support further being provided with a latch for releasably securing the support to the selected meter in a position to maintain the drive assembly operably coupled with the meter.

\* \* \* \* \*